(12) United States Patent
Mizuno

(10) Patent No.: US 9,213,723 B2
(45) Date of Patent: Dec. 15, 2015

(54) IMAGE DISTRIBUTION APPARATUS AND IMAGE DISTRIBUTION METHOD

(71) Applicant: CANON KABUSHIKI KAISHA, Tokyo (JP)

(72) Inventor: Takashi Mizuno, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 195 days.

(21) Appl. No.: 13/940,923

(22) Filed: Jul. 12, 2013

(65) Prior Publication Data

US 2013/0301956 A1 Nov. 14, 2013

Related U.S. Application Data

(63) Continuation of application No. 12/915,285, filed on Oct. 29, 2010, now Pat. No. 8,503,831.

(30) Foreign Application Priority Data

Nov. 4, 2009 (JP) ................................. 2009-253524
Sep. 24, 2010 (JP) ................................. 2010-214336

(51) Int. Cl.
*H04N 1/00* (2006.01)
*G06F 17/30* (2006.01)
*H04N 1/32* (2006.01)

(52) U.S. Cl.
CPC ...... *G06F 17/30247* (2013.01); *H04N 1/00159* (2013.01); *H04N 1/00217* (2013.01); *H04N 1/32128* (2013.01); *H04N 2201/328* (2013.01); *H04N 2201/3253* (2013.01); *H04N 2201/3278* (2013.01)

(58) Field of Classification Search
None
See application file for complete search history.

(56) References Cited

U.S. PATENT DOCUMENTS

2003/0142854 A1* 7/2003 Cho et al. ....................... 382/118
2011/0292231 A1* 12/2011 Winters ....................... 348/222.1

FOREIGN PATENT DOCUMENTS

| JP | 2008-027336 A | 2/2008 |
| JP | 2008-283348 A | 11/2008 |
| JP | 2009-009305 A | 1/2009 |

OTHER PUBLICATIONS

The above foreign patent documents were cited in the Jul. 14, 2014 Japanese Office Action, which is enclosed without an English Translation, that issued in Japanese Patent Application No. 2010-214336.

* cited by examiner

*Primary Examiner* — Jon Chang
(74) *Attorney, Agent, or Firm* — Cowan, Liebowitz & Latman, P.C.

(57) ABSTRACT

The present invention enables image distribution while maintaining privacy, using a simple configuration. An image distribution apparatus which distributes image data to which location information has been added stores information specifying an inhibited area concerning the location information and determines whether or not a location indicated by the location information added to the image data to be distributed falls within the stored inhibited area. If it is determined that the location indicated by the location information falls within the inhibited area, the image distribution apparatus distributes the image data by deleting the location information from the image data to be distributed. On the other hand, if it is determined that the location indicated by the location information falls outside the inhibited area, the image distribution apparatus distributes the image data with the location information added.

7 Claims, 14 Drawing Sheets

| LATITUDE | LONGITUDE | RADIUS | COMMENT | |
|---|---|---|---|---|
| N50° 45' | E130° 12' | 1000m | MY HOME | ~610 |
| N50° 14' | E129° 35' | 100m | CHUKYO LAND | ~611 |
| N49° 45' | E132° 48' | 300m | MARUNOUCHI | ~612 |
| N48° 28' | E131° 39 | 125m | | ~613 |

CURRENT LOCATION: 50° 45' NORTH LATITUDE AND 130° 12' EAST LONGITUDE

NORTHWARD / SOUTHWARD DISTANCE FROM CURRENT LOCATION : 500 m    902

EASTWARD / WESTWARD DISTANCE FROM CURRENT LOCATION : 350 m    903

BEFORE DISTRIBUTION, DELETE LOCATION INFORMATION FROM ANY IMAGE SHOT WITHIN THE ABOVE RANGE    503

COMMENT ON LOCATION : MY HOME

504 CANCEL    505 SET

| LATITUDE | LONGITUDE | EAST-WEST DIRECTION | NORTH-SOUTH DIRECTION | COMMENTS |
|---|---|---|---|---|
| N50° 45' | E130° 12' | 1500m | 1500m | MY HOME |
| N50° 14' | E129° 35' | 150m | 100m | CHUKYO LAND |
| N49° 45' | E132° 48' | 400m | 300m | MARUNOUCHI |
| N48° 28' | E131° 39' | 75m | 125m | |
| ⋮ | | | | |

1001 1002 1003 1004 1005, row 1010

FIG. 6C

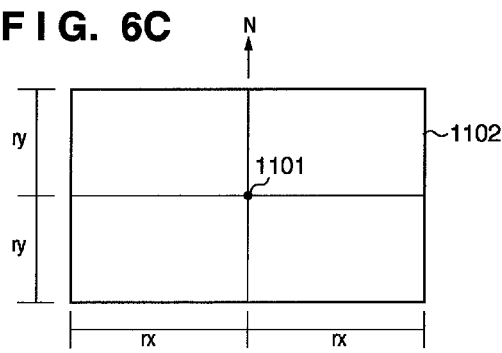

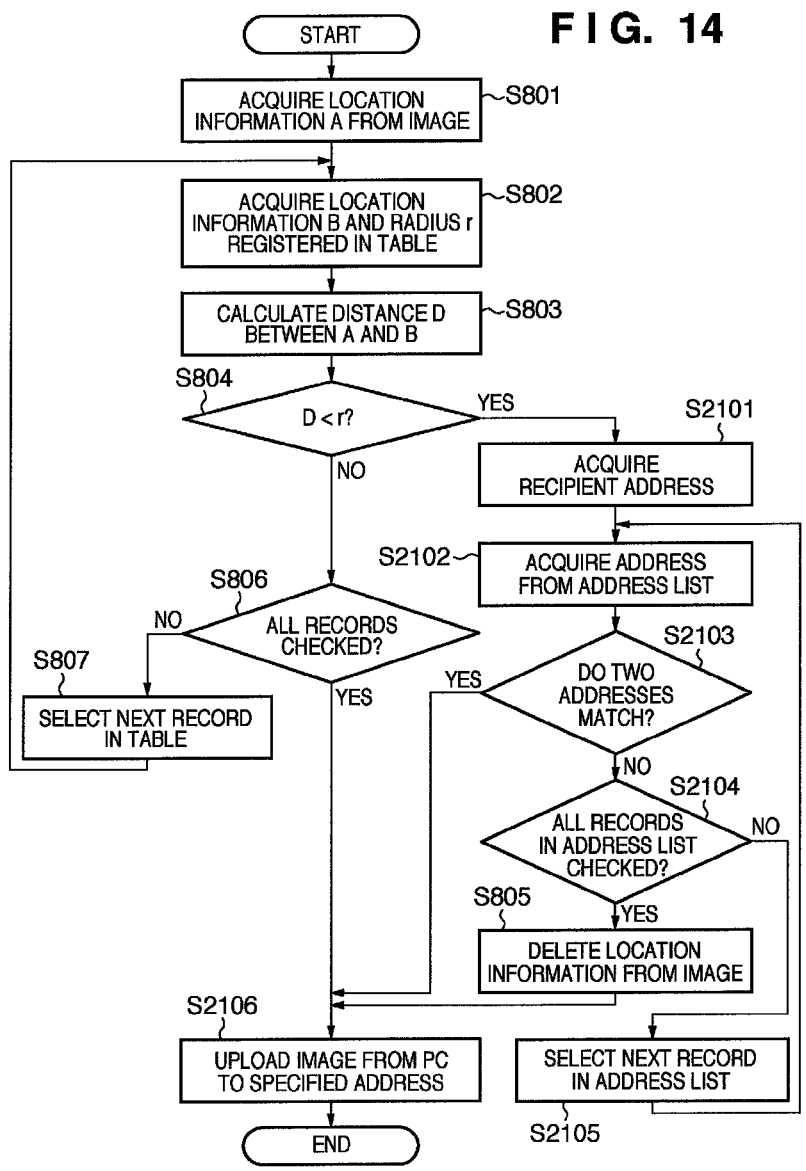

IMAGE DISTRIBUTION APPARATUS AND IMAGE DISTRIBUTION METHOD

CROSS-REFERENCE TO RELATED APPLICATIONS

This application is a continuation of application Ser. No. 12/915,285, filed Oct. 29, 2010 the entire disclosure of which is hereby incorporated by reference.

BACKGROUND OF THE INVENTION

1. Field of the Invention

The present invention relates to an image distribution apparatus and image distribution method which distribute image data.

2. Description of the Related Art

Recently, digital cameras equipped with a GPS (Global Positioning System) function have appeared on the market. Such a digital camera allows location information to be added to shot images. Also, there is application software which displays the images to which location information has been added on a map. Besides, it has recently become possible to distribute images to many people by uploading the images onto a server. Consequently, it is pointed out that location information added to the images may cause infringement on the privacy of the photographer or photographed person.

Under these circumstances, Japanese Patent Laid-Open No. 2008-027336 (hereinafter referred to as Document 1) proposes to put restrictions on publication of images to protect privacy by managing image data and location information in different databases. On the other hand, Japanese Patent Laid-Open No. 2004-343627 (hereinafter referred to as Document 2) proposes to delete all additional information of images including location information before uploading the images onto a server.

However, the technique in Document 1 has a problem of increased costs because of the need to prepare two databases (database for image data and database for location information). Also, the technique in Document 2 deletes, from the images, not only the location information, but also additional information which the user wants to publish. That is, the conventional techniques cannot distribute images while protecting privacy, using a simple configuration.

SUMMARY OF THE INVENTION

The present invention has been made in view of the above problems and provides an image distribution apparatus and method, one preferred embodiment of which enables image distribution while maintaining privacy, using a simple configuration.

According to one aspect of the present invention, there is provided an image distribution apparatus which distributes image data to which location information has been added, comprising: a storage unit configured to store information specifying an inhibited area concerning the location information; an acquisition unit configured to acquire the location information added to the image data to be distributed; a location checking unit configured to determine whether or not a location indicated by the location information acquired by the acquisition unit falls within the inhibited area stored in the storage unit; and a distribution control unit configured to distribute the image data by deleting the location information from the image data to be distributed if the location checking unit determines that the location falls within the inhibited area and distribute the image data with the location information added if the location checking unit determines that the location falls outside the inhibited area.

Furthermore, according to another aspect of the present invention, there is provided an image distribution method for an image distribution apparatus which distributes image data to which location information has been added, the image distribution method comprising: an acquisition step in which an acquisition unit acquires the location information added to the image data to be distributed; a location checking step in which a location checking unit determines whether or not a location indicated by the location information acquired by the acquisition unit falls within an inhibited area concerning the location information, stored in a storage unit; and a distribution control step in which a distribution control unit distributes the image data by deleting the location information from the image data to be distributed if the location checking unit determines that the location falls within the inhibited area, and distributes the image data with the location information added if the location checking unit determines that the location falls outside the inhibited area.

Further features of the present invention will become apparent from the following description of exemplary embodiments with reference to the attached drawings.

BRIEF DESCRIPTION OF THE DRAWINGS

FIG. 6A is a diagram showing an example of a UI used to set an inhibited area concerning location information, according to a second embodiment;

FIG. 6B is a diagram showing an example of a table storing inhibited areas;

FIG. 6C is a diagram showing a range of a rectangular area;

FIG. 14 is a diagram showing an image distribution process according to the fourth embodiment.

DESCRIPTION OF THE EMBODIMENTS

Embodiments of the present invention will be described below in detail with reference to the accompanying drawings.

<First Embodiment>

Figure 1A:
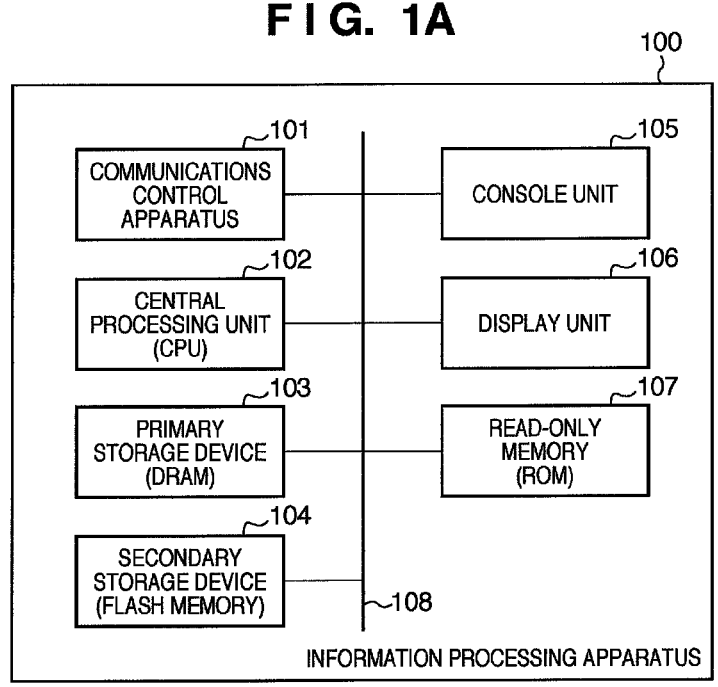
FIG. 1A is a diagram showing a configuration example of an information processing apparatus.

FIG. 1A is a diagram showing a configuration example of an information processing apparatus 100 used as an image distribution apparatus, according to an embodiment of the present invention. In the information processing apparatus 100, a communications control apparatus 101, which is a unit configured to communicate with external apparatuses, controls wired or wireless communications with the external apparatuses. A central processing unit (CPU) 102 controls the entire information processing apparatus 100 based on input signals and programs. A primary storage device (DRAM) 103 is used as a temporary storage area and the like for the CPU 102. A secondary storage device 104 includes a non-volatile storage device such as a flash memory and stores various parameters and the like. A console unit 105 includes a keyboard, mouse, and the like and allows a user to give various commands to the information processing apparatus 100. A display unit 106 is a member used to display image data and a graphical user interface (GUI). For example, a LCD or the like is used as the display unit 106. A read-only memory (ROM) 107 stores a control program to be executed by the CPU 102. A CPU bus 108 includes an address bus, data bus, and control bus.

Figure 1B:
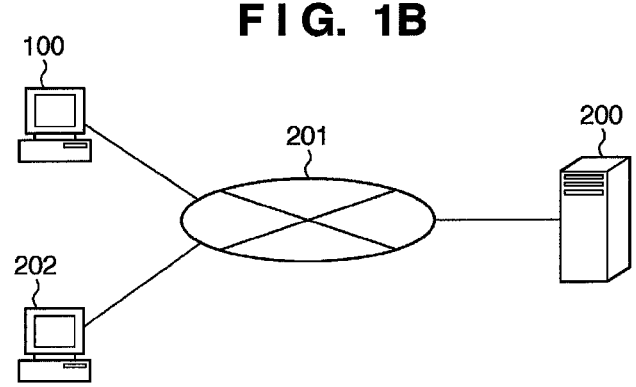
FIG. 1B is a diagram showing an example of an entire system.

A configuration example of an entire system according to the present embodiment is shown in FIG. 1B. The information processing apparatus 100 is connected via a network 201 to a server 200, which is an external apparatus, in such a way as to be able to communicate with the server 200. The information processing apparatus 100 is also connected to another information processing apparatus 202 via the network 201 in such a way as to be able to communicate with the information processing apparatus 202 as well. According to the present embodiment, the connection to the network may be either a wired type or wireless type.

Figure 2A:
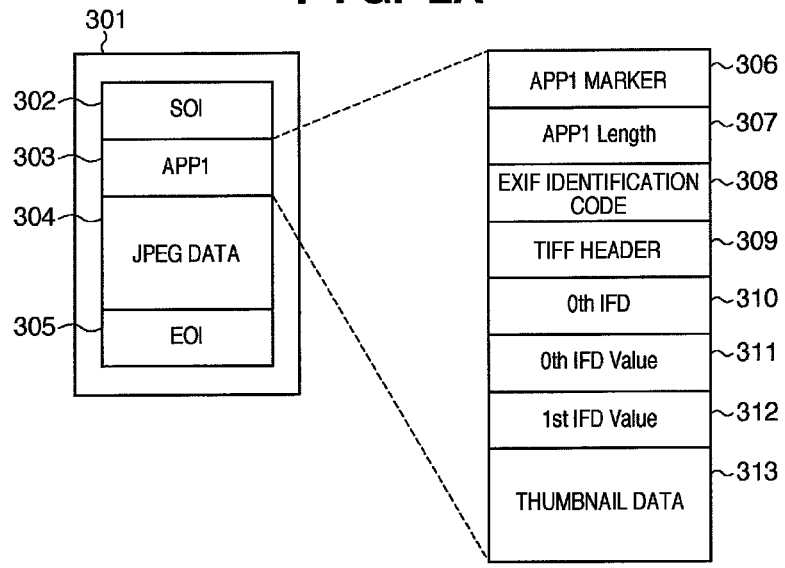
FIG. 2A is a diagram showing a structure of a jpg file.

Next, a structure of image data used in the present embodiment will be described. According to the present embodiment, it is assumed that the image data is contained in a "JPEG file" in JPEG format and that additional information is in Exif format, but these are not restrictive. FIG. 2A is a diagram showing a structure of the image data used in the present embodiment, that is, the structure of a "JPEG file."

As shown in FIG. 2A, in a JPEG file 301, section 302 (SOI) stores data which indicates the top of a "JPEG file." Section 303 (APP1) is called an application marker segment and stores Exif additional information described later. Hereinafter section 303 will be referred to as the application marker segment 303. Section 304 (JPEG data) is intended to store JPEG-compressed image data and stores parameters needed for compression as well as stores compressed image data. Section 305 (EOI) stores data which indicates the end of the JPEG file 301.

Section 306 (APP1 marker) stores data which indicates the top of the application marker segment 303. In the present example, the character string "FFE1" is recorded in section 306. Section 307 (APP1 Length) stores size of the application marker segment 303. Section 308 stores a code (Exif identification code) used to identify Exif additional information. Section 309 records a TIFF header, that is, an offset which indicates head position of IFD data in an IFD (Image File Directory) structure described later with reference to FIG. 2B. Section 310 (0th IFD) has a structure known as IFD and stores attribute information of image data. Example of the attribute information includes information regarding data structure of an image, recording position of the image (location information), characteristics of image data, and an image sensing device. Section 311 (0th IFD Value) stores a concrete value of part of the attribute information in section 310. Section 312 (1st IFD Value) records attribute information of thumbnails. Section 313 stores thumbnail data.

Figure 2B:
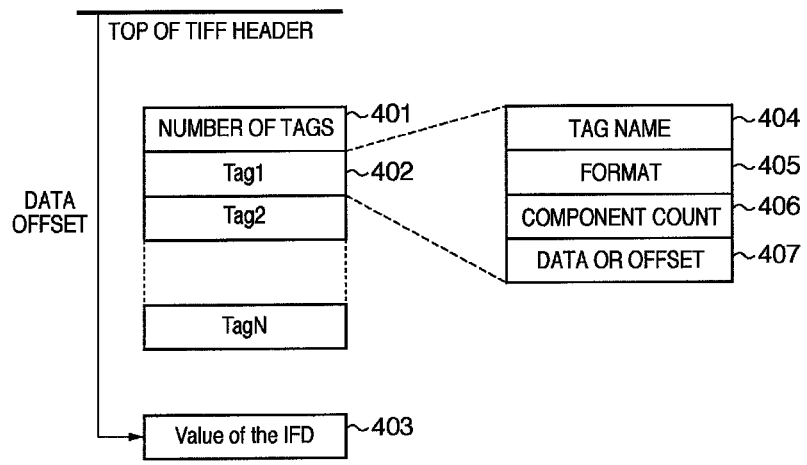
FIG. 2B is a diagram showing a structure of an IFD.

FIG. 2B is a diagram showing a structure of an IFD. Field 401 records the number of tags, where the tag is a unit for describing parameters of attribute information. IFD data contains as many tags are there are parameters. When the number of tags is 10 (N=10), "10" is recorded in field 401. Field 402 (tag) stores a tag which has field 404 (tag name), field 405 (format), field 406 (component count), and field 407 (data or offset).

Field 404 stores a tag name (a number which represents an item of attribute information, according to the present embodiment). Field 405 stores format information which represents data type of attribute information. Examples of the data type of the attribute information include 1-byte data, 2-byte data, character string, and fraction. Field 406 stores component count which represents how many data items of the type specified in field 405 (format) are contained in one tag. For example, if the attribute information is given as character string data of 20 characters, "character string" is recorded in field 405 (format) and "20" is recorded in field 406 (component count). Also, for example, if the attribute information contains two items of 2-byte data, "2-byte data" is recorded in field 405 (format) and "2" is recorded in field 406 (component count).

Field 407 (data or offset) stores the attribute information itself or data which represents an offset from the top of the TIFF header recorded in section 309. Field 407 has a 4-byte fixed length. Consequently, if the attribute information is too large to be stored in 4 bytes, the attribute information is recorded at an address (field 403) indicated by the offset from the top of the TIFF header in section 309. In this case, value of the offset from the TIFF header in section 309 is recorded in field 407 (data or offset).

An example of how location information is recorded in an image file will be described below. According to the present embodiment, location information to be recorded is given in terms of longitude and latitude (e.g., 50° 13' north latitude and 140° 48' east longitude) and recorded in IFD (GPS IFD) format in the image file. The location information is recorded in field 402. In this case, a tag which indicates location information is recorded in field 404 (tag name) of field 402 (tag). In this example, a numerical value of 0×8825 is recorded. The data format (GPS IFD, in this example) of the location information is recorded in field 405 (format). Since the Exif standard prescribes that the data type of GPS IFD location information is 4-byte data, a numerical value of "4" is entered in field 406 (component count). The offset from the top of the TIFF header in section 309 is recorded in field 407 (data or offset). That is, the location information is recorded in GPS IFD format at an address separated from the top of the TIFF header stored in section 309 by a distance equal to a byte count recorded in field 407 (data or offset).

The GPS IFD also has the structure shown in FIG. 2B. The number of tags needed for location information is recorded in field 401 (number of tags). In this example, five tags are recorded: GPS tag version, information indicating north latitude or south latitude, latitude, information indicating east longitude or west longitude, and longitude. Consequently, "5" which is the number of tags is recorded in field 401

(number of tags). The GPS tag version is recorded in field 402 (tag). In so doing, information corresponding to the "GPS tag version" is recorded in field 404 (tag name), field 405 (format), field 406 (component count), and field 407 (data or offset), respectively. Similarly, "information indicating north latitude or south latitude," "latitude tag," "information indicating east longitude or west longitude," and lastly "longitude tag" are recorded in subsequent tag fields. The latitude and longitude are recorded in the form of a 4-byte/4-byte fraction. For example, "50° 13'" is recorded as "3013" and "60" while "140° 48'" is recorded as "8448" and "60."

Incidentally, the image data used in the present embodiment is not limited to JPEG files in Exif format as long as additional information such as location information can be added to the image data.

Figures 3A, 3B:
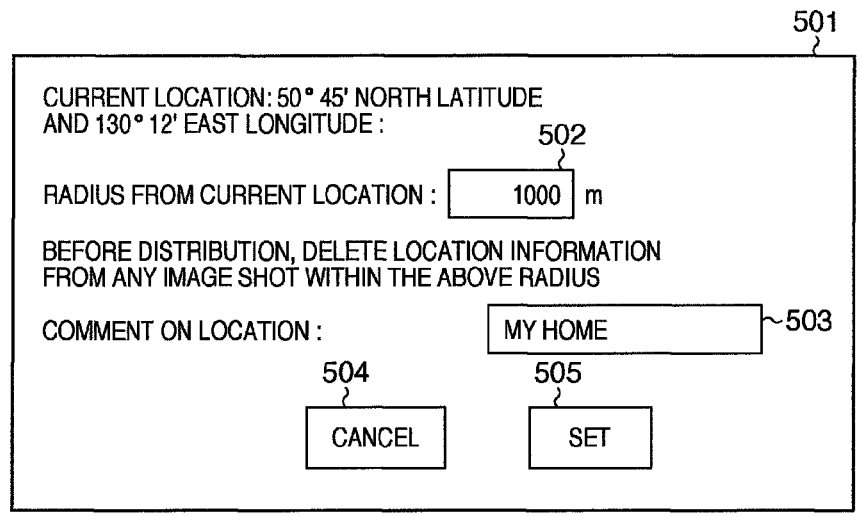
FIG. 3A is a diagram showing an example of a user interface (UI) used to set an inhibited area concerning location information.
FIG. 3B is a diagram showing an example of a table storing inhibited areas.

FIG. 3A shows a setting screen used by the user to enter inputs and thereby specify a deletion range to the information processing apparatus 100 when deleting location information from image data. As the CPU 102 executes a predetermined program, a setting screen such as shown in FIG. 3A is brought up in the display unit 106. The setting screen allows the user to set an inhibited area by entering latitude and longitude which represent a location on the ground and a radius which represents a range. According to the present embodiment, if location information added to image data indicates a location within a specified inhibited area, the image data is distributed with the location information deleted. The setting screen 501 displays the location acquired from the location information of an image, in terms of longitude and latitude. By watching the setting screen 501, the user enters a radius in a box 502, and a comment on the location in a box 503. Incidentally, it is not always necessary to enter a comment. When the user presses a setting button 505, the range of location information to be deleted from the image is stored in tabular form shown in FIG. 3B, in the secondary storage device 104 of the information processing apparatus 100. By pressing a cancel button 504, the user can exit the setting screen 501 without doing anything. According to the entered data in FIG. 3A, an inhibited area is located within a 1000-m radius around the point at 50° 45' north latitude and 130° 12' east longitude. Alternatively, an area to be excluded from the inhibited area may be specified. The current location may be acquired from a GPS sensor. Alternatively, the user may be allowed to specify a desired location on a displayed digital map and the longitude and latitude of the specified location may be used as the current location.

FIG. 3B is a diagram showing a table 600 storing the range of location information to be deleted from an image stored in the information processing apparatus 100, when the image is distributed. The table 600 stores latitude 601, longitude 602, a radius 603 entered in the box 502, and a comment 604 entered in the box 503. When the Set button 505 is pressed under the conditions displayed on the screen in FIG. 3A, contents of record 610 is registered. The comment 604 describes the location defined by the latitude 601 and longitude 602 and contains a location name, facility name, place name, or the like. However, the comment 604 may be left empty. A range indicated by each record of the table 600, that is, a range of a circle with a radius indicated by the radius 603 centered at a geographical location defined by the latitude 601 and longitude 602, corresponds to an inhibited area. In the example of FIG. 3B, it can be seen that four inhibited areas (records 611 to 613) are registered.

Figure 4:
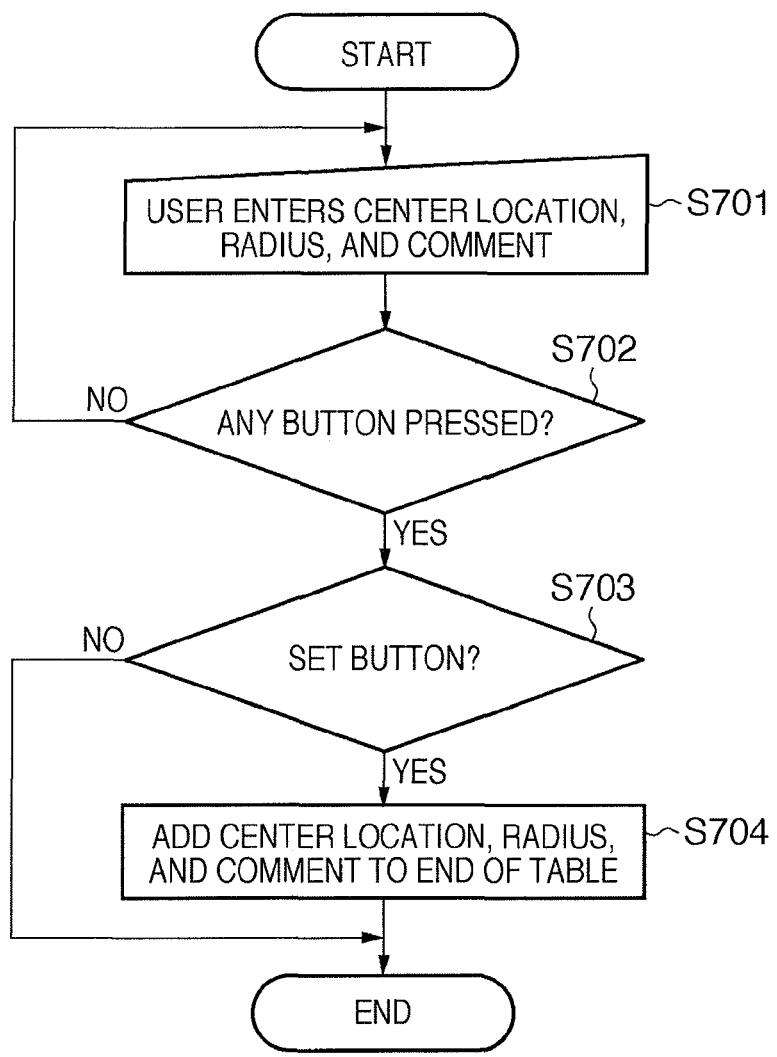
FIG. 4 is a diagram showing a registration process of a inhibited area according to a first embodiment.

A process flow for registering an inhibited area in the table 600 will be described below with reference to FIG. 4.

In step 5701, the CPU 102 accepts inputs of latitude, longitude, radius, and comment from the user. As described above, to enter the latitude and longitude, a GPS signal is used or the user is allowed to specify a desired location on a displayed map. On the other hand, the radius and comment are entered by the user via the boxes 502 and 503, respectively. Next, in step S702, the CPU 102 determines whether or not any button has been pressed. If it is determined in step 5702 that a button has been pressed, the CPU 102 goes to step S703. If it is determined in step S702 that no button has been pressed, the CPU 102 repeats steps S701 and S702 until a button is pressed. In step S703, the CPU 102 determines whether the pressed button is the Set button 505. If it is determined in step S703 that the pressed button is the Set button 505, the CPU 102 goes to step S704 to add a new record containing the latitude, longitude, radius, and comment entered in step S701 to the end of the table 600. It is assumed that the table 600 is recorded in the secondary storage device 104. On the other hand, if it is determined in step S703 that the Cancel button 504 has been pressed, the CPU 102 finishes the process right away.

Figure 5:
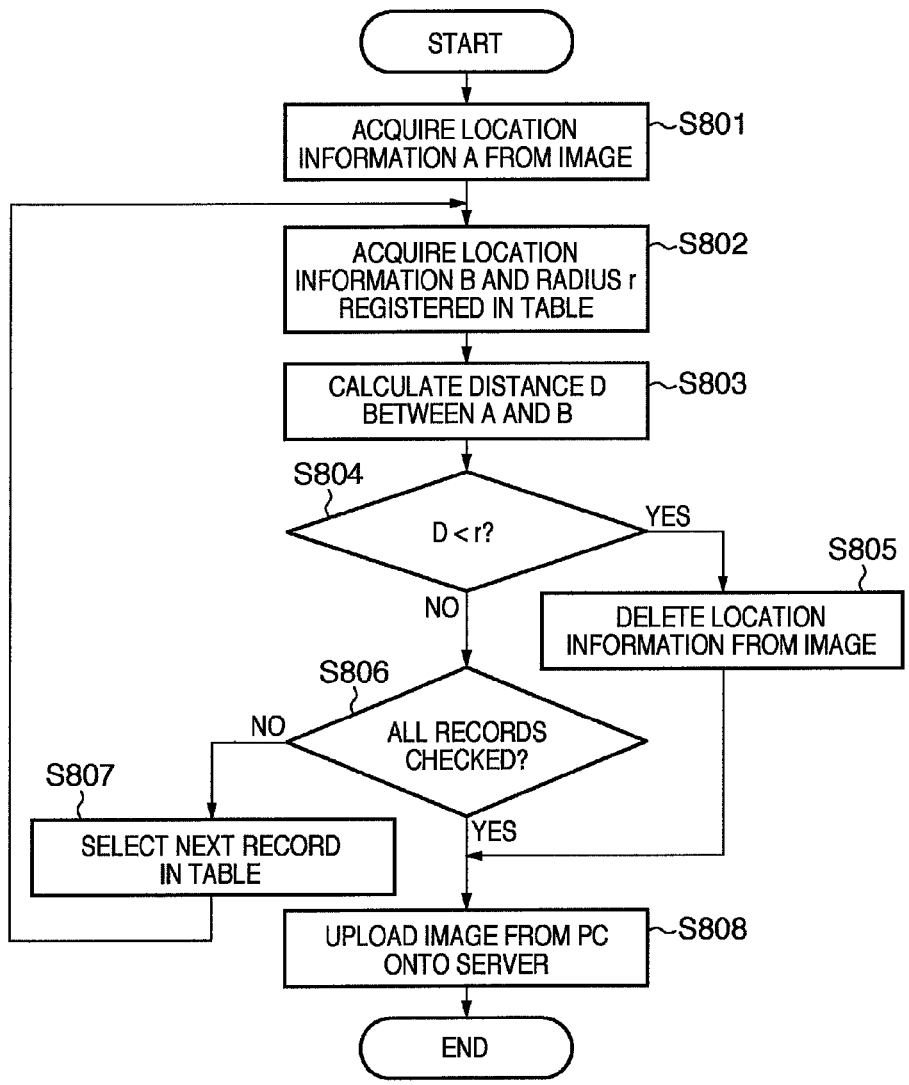
FIG. 5 is a diagram showing an image distribution process according to the first embodiment.

FIG. 5 is a diagram showing image distribution control according to the present embodiment. According to the present embodiment, it is determined before distribution of an image whether location information has to be deleted from the image. If it is determined that the location information has to be deleted, the image is distributed with the location information deleted.

In step S801, the CPU 102 acquires the location information added to the image to be distributed. In step S802, the CPU 102 acquires a record containing an inhibited area from the table 600. In steps S803 and S804, the CPU 102 carries out location checking to determine whether the location indicated by the location information acquired from the image to be distributed falls within the inhibited area stored in the table 600. In step S803, the CPU 102 calculates a distance D between the location indicated by the location information acquired in step S801 and the location (center location) of the inhibited area acquired in step S802. A method for determining distance between two points whose latitude and longitude are known will be described below:

For example, if a location (point A) prerecorded in the table is 50° 45' north latitude and 130° 12' east longitude and the current location (point B) is 50° 34' north latitude and 129° 58' east longitude and if a difference in a latitudinal direction is Δny and a difference in a longitudinal direction is Δnx, $$\Delta ny=11' \rightarrow 0.183°$$

$$\Delta nx=14' \rightarrow 0.233°$$

It is assumed here that the earth is perfectly spherical and that the radius of the earth is R (=6378 km). If distance difference in the latitudinal direction is Δy and distance difference in the longitudinal direction is Δx, then Δy and Δx are given by the equations below.

$$\Delta y=0.183°/360°\times 2\pi R=20.37 \text{ km}$$

$$\Delta x=0.233°/360°\times 2\pi R=25.94 \text{ km}$$

Thus, the distance D between two points A and B is given by the equation below.

$$D=\sqrt{(\Delta x^2+\Delta y^2)}=32.98 \text{ km}$$

In step S804, the CPU 102 makes a comparison to determine whether the distance D determined in step S803 is smaller than a radius r of the inhibited area registered in the table 600. If it is determined in step S804 that the distance D is smaller than the radius r registered in the table 600, the location indicated by the location information of the image to be distributed falls within the inhibited area. When a location falls within this range, the location information about the location must not be added to the image to be distributed. Thus, in step S805, the CPU 102 deletes the location information from the image. Then, the CPU 102 goes to step S808 to upload the image onto the server (or deliver the image to an appropriate recipient).

If it is determined in step S804 that the distance D is larger than the radius r of the inhibited area, the CPU 102 goes to step S806. In step S806, the CPU 102 determines whether all the records registered in the table 600 in FIG. 3B have been checked. If it is determined in step S806 that all the records have been checked, the CPU 102 goes to step S808. If it is determined in step S806 that all the records in the table 600 have not been checked, the CPU 102 goes to step S807 to select a next record in the table 600. Then, the CPU 102 returns to step S802.

As described above, the first embodiment can protect the privacy of the photographer or photographed persons in an image containing location information concerning a specified inhibited area even if the user does not go to the trouble of making privacy protection settings before distribution.

<Second Embodiment>

Although in the first embodiment, the inhibited area is specified as the range of a circle defined by a center location and radius, the method for specifying the range is not limited to the use of a circle. As an example of another range specification method, a method described in the second embodiment specifies a range using a rectangle defined by a center location, distance from the center location in an east-west direction, and distance from the center location in a north-south direction.

A setting screen used to set an inhibited area according to the second embodiment is shown in FIG. 6A. The setting screen is displayed in the display unit 106 of the information processing apparatus 100. On the setting screen 901, the user enters the distance rx(m) in the east-west direction in a box 903, and the distance ry(m) in the north-south direction in a box 902. Otherwise, the second embodiment is the same as the first embodiment (FIG. 3A). When the user presses the Set button 505, the settings on the setting screen 901 is registered as an inhibited area in record 1010 of a table 1000 such as shown in FIG. 6B. The table 1000 is stored in the secondary storage device 104 of the information processing apparatus 100. Record 1010 contains latitude 1001 and longitude 1002 which represent a geographical location as well as the east-west direction 1003 and north-south direction 1004 which represent size of a range centered around the geographical location.

According to the second embodiment, the inhibited area is set as shown in FIG. 6C. In FIG. 6C, the upward direction corresponds to the north. A range specified as the inhibited area corresponds to a rectangular area 1102 stretching rx eastward, rx westward, ry southward, and ry northward from a center location 1101. Incidentally, rx is registered as the east-west direction 1003 and ry is registered as the north-south direction 1004.

Figure 7:
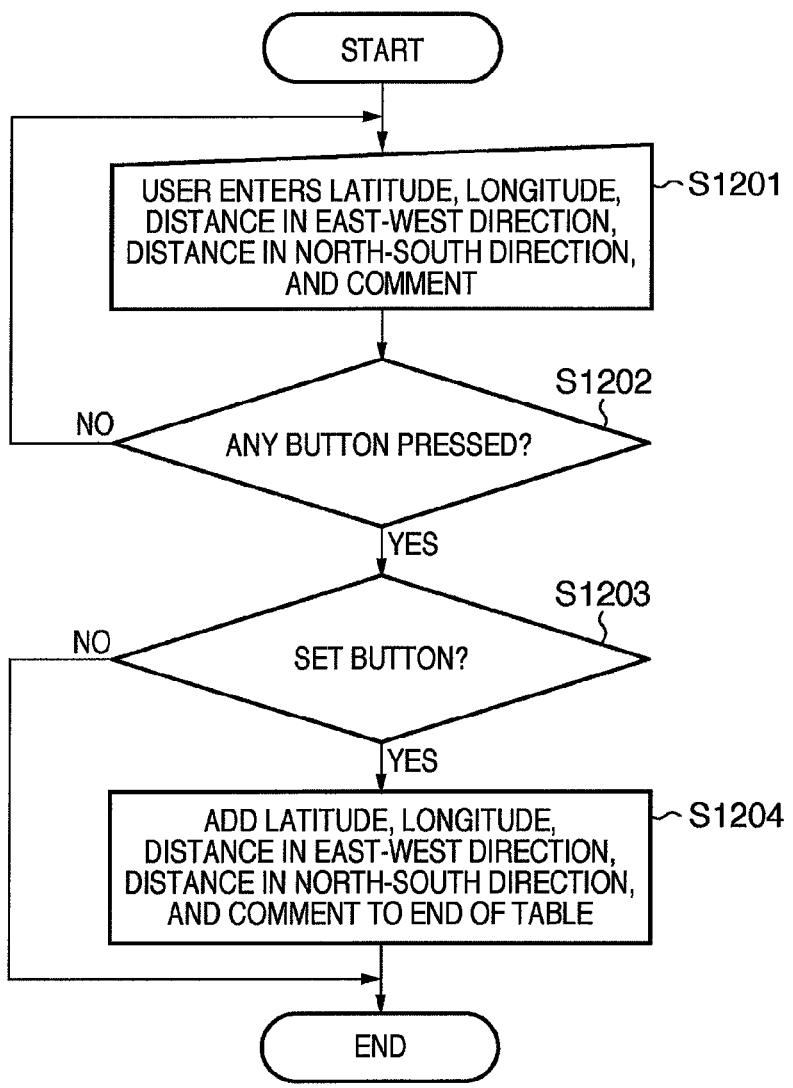
FIG. 7 is a diagram showing a registration process of an inhibited area according to the second embodiment.

A registration process of an inhibited area according to the second embodiment will be described below with reference to FIG. 7. In step S1201, the CPU 102 presents the setting screen 901 and accepts inputs of latitude, longitude, distance in the east-west direction, distance in the north-south direction, and comment from the user. In step S1202, the CPU 102 determines whether or not any button has been pressed. If it is determined in step S1202 that a button has been pressed, the CPU 102 goes to step S1203. If it is determined in step S1202 that no button has been pressed, the CPU 102 repeats steps S1201 and S1202 until a button is pressed.

In step S1203, the CPU 102 determines whether or not the pressed button is the Set button 505. If it is determined in step S1203 that the pressed button is the Set button 505, the CPU 102 goes to step S1204. In step S1204, the CPU 102 adds record 1010 containing the latitude, longitude, distance in the east-west direction, distance in the north-south direction, and comment specified on the setting screen 901 to the end of the table 1000. The table 1000 is stored in the secondary storage device 104. On the other hand, if it is determined in step S1203 that the Cancel button 504 has been pressed, the CPU 102 finishes the process without doing anything.

Figure 8:
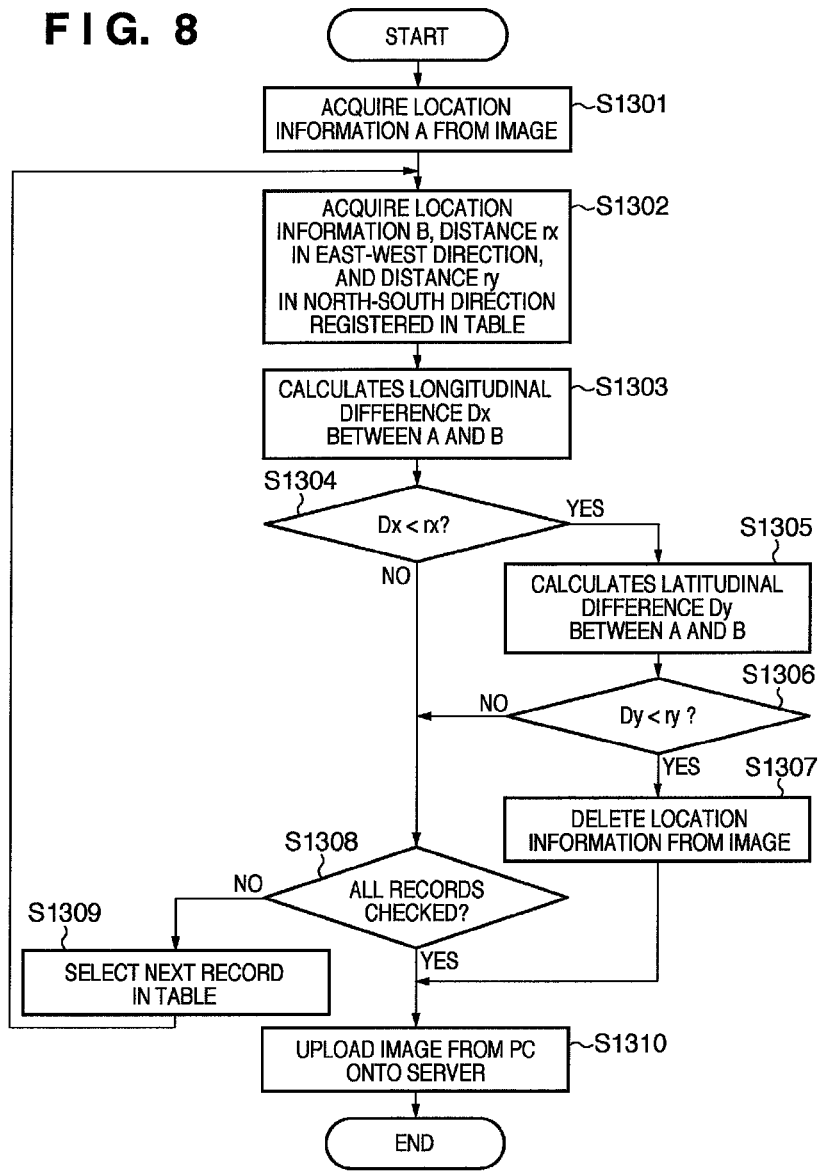
FIG. 8 is a diagram showing an image distribution process according to the second embodiment.

Now, image distribution control according to the second embodiment will be described below with reference to FIG. 8. In step S1301, the CPU 102 acquires the location information added to the image to be distributed. In steps S1302 to S1306, the CPU 102 determines whether the location indicated by the location information acquired from the image to be distributed falls within the inhibited area stored in the table 1000. In step S1302, the CPU 102 acquires information about the center location (latitude 1001 and longitude 1002), the distance rx in the east-west direction 1003, and the distance ry in the north-south direction 1004 from the record registered in the table 1000. In step S1303, the CPU 102 calculates a longitudinal difference Dx between the location indicated by the location information acquired in step S1301 and the center location acquired in step S1302. In step S1304, the CPU 102 makes a comparison to determine whether the longitudinal difference Dx determined in step S1303 is smaller than the distance rx in the east-west direction acquired in step S1302.

If it is determined in step S1304 that the longitudinal difference Dx is smaller than the distance rx in the east-west direction, the CPU 102 goes to step S1305. In step S1305, the CPU 102 calculates a latitudinal difference Dy between the location indicated by the location information acquired in step S1301 and the center location acquired in step S1302. In step S1306, the CPU 102 makes a comparison to determine whether the latitudinal difference Dy determined in step S1305 is smaller than the distance ry in the north-south direction acquired in step S1302. If it is determined in step S1306 that the latitudinal difference Dy is smaller than the distance ry in the north-south direction, it follows that the location indicated by the location information added to the image to be distributed falls within the inhibited area such as shown in FIG. 6C. Thus, the CPU 102 deletes the location information from the image in step S1307, and then goes to step S1310. In step S1310, the CPU 102 uploads the image (or delivers the image to an appropriate recipient).

If it is determined in step S1304 that "the longitudinal difference Dx ≥ the distance rx in the east-west direction" or if it is determined in step S1306 that "the latitudinal difference Dy ≥ the distance ry in the north-south direction," the CPU 102 goes to step S1308. In step S1308, the CPU 102 determines whether all the records in the table 1000 have been checked. If it is determined in step S1308 that all the records have been checked, the CPU 102 goes to step S1310. If it is determined in step S1308 that all the records in the table 1000 have not been checked, the CPU 102 goes to step S1309 to select a next record in the table 1000. Then, the CPU 102 returns to step S1302.

As described above, the second embodiment can protect the privacy of the photographer or photographed persons in an image shot in a specified rectangular area even if the user does not go to the trouble of making privacy protection settings before distribution, as in the case of the first embodiment.

<Third Embodiment>

According to the first and second embodiments, when the location indicated by the location information added to the image to be distributed falls within an inhibited area, the image is distributed with the location information deleted. According to the third embodiment, even when the location indicated by the location information in the image falls within an inhibited area, the location information is not deleted if a predetermined condition is satisfied. As an example of the predetermined condition, according to the third embodiment, the location information is not deleted if the image does not contain a preregistered pattern (the location information is deleted only when the image contains the preregistered pattern). In the following description, a human face is registered as an example of the pattern.

Figure 9:
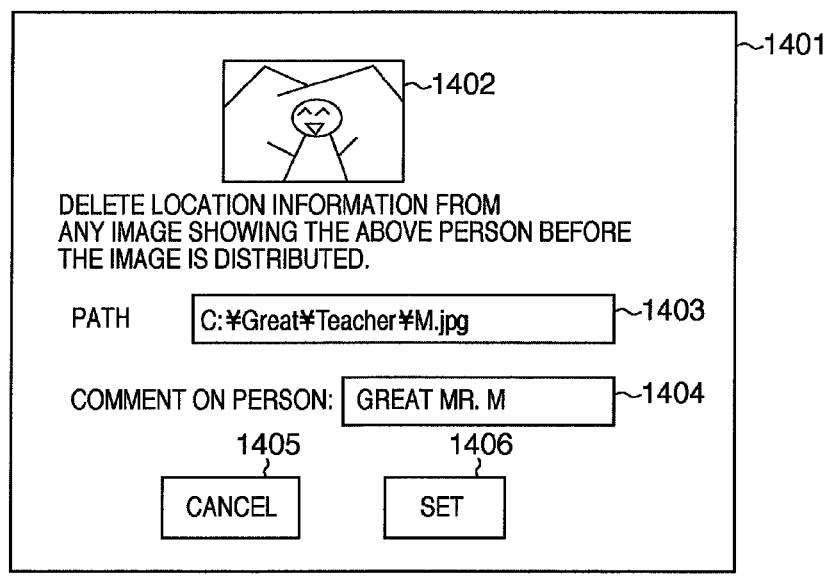
FIG. 9A is a diagram showing an example of a UI used for registration of a facial image, according to a third embodiment.
FIG. 9B is a diagram showing an example of an image list.

It is assumed that a facial recognition program is stored in the read-only memory 107 of the information processing apparatus 100, allowing the CPU 102 to identify faces in the image on an individual basis. A setting screen used by the user to enter inputs for image registration in the third embodiment is shown in FIG. 9A. The setting screen 1401 is displayed in the display unit 106 of the information processing apparatus 100. The user registers faces by watching the setting screen 1401 (registration of facial images). For example, when a path to an image showing a face is entered in a box 1403 on the setting screen 1401, an appropriate image appears in an image display area 1402. Any comment (text) can be entered in a box 1404. When the user presses a Set button 1406, record 1510 is additionally registered in an image list 1500 as shown in FIG. 9B. The image list 1500 is stored in the secondary storage device 104 of the information processing apparatus 100. Each record of the image list 1500 includes an image path 1501 field containing an entry of the box 1403 and a comment 1502 field containing an entry of the box 1404. The comment 1502 field may be omitted.

Figure 10:
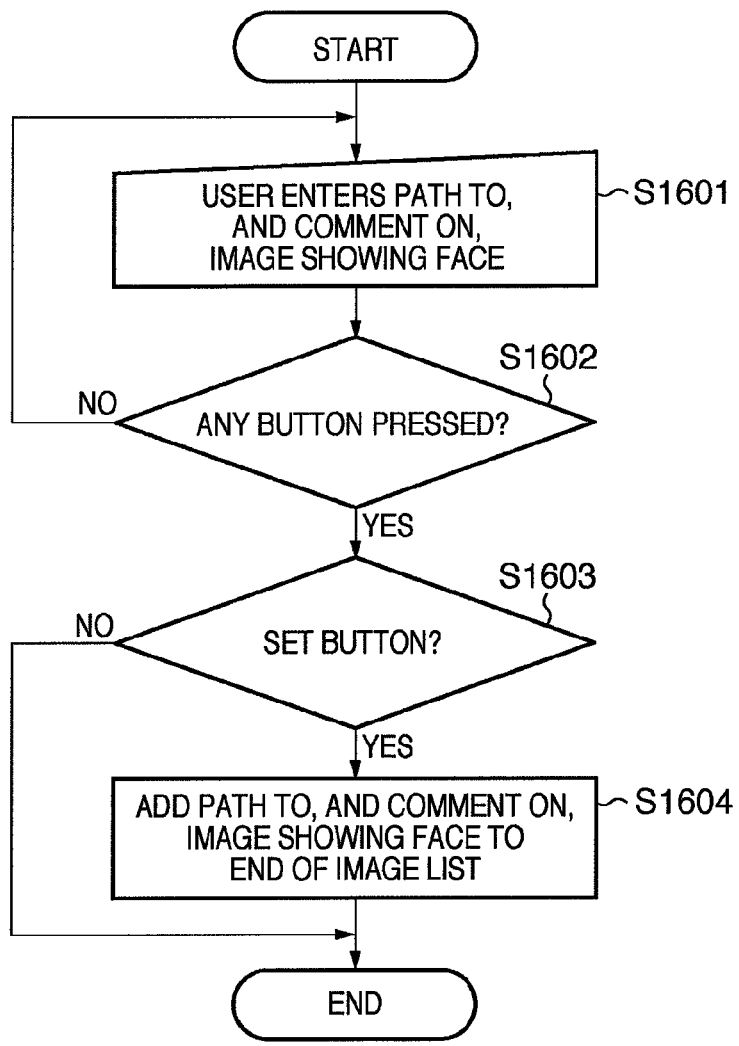
FIG. 10 is a diagram showing the process of registering an image in an image list, according to the third embodiment.

Procedures for registering an image in the image list 1500 will be described below with reference to FIG. 10. In step S1601, the CPU 102 displays the setting screen 1401 in the display unit 106. The user can enter a path to, and a comment on, an image showing a face in the boxes 1403 and 1404 of the setting screen 1401, respectively. In step S1602, the CPU 102 determines whether any button on the setting screen 1401 has been pressed. If it is determined in step S1602 that a button has been pressed, the CPU 102 goes to step S1603. If it is determined in step S1602 that no button has been pressed, the CPU 102 repeats steps S1601 and S1602 until a button is pressed. In step S1603, the CPU 102 determines whether or not the pressed button is the Set button 1406. If it is determined in step S1603 that the pressed button is the Set button 1406, the CPU 102 goes to step S1604. In step S1604, the CPU 102 adds a new record 1510 containing the "image path" and "comment" specified in the setting screen 1401 to the end of the image list 1500. It is assumed that the image list 1500 is recorded in the secondary storage device 104. On the other hand, if it is determined in step S1603 that the Cancel button 1405 has been pressed, the CPU 102 finishes the process.

Figure 11:
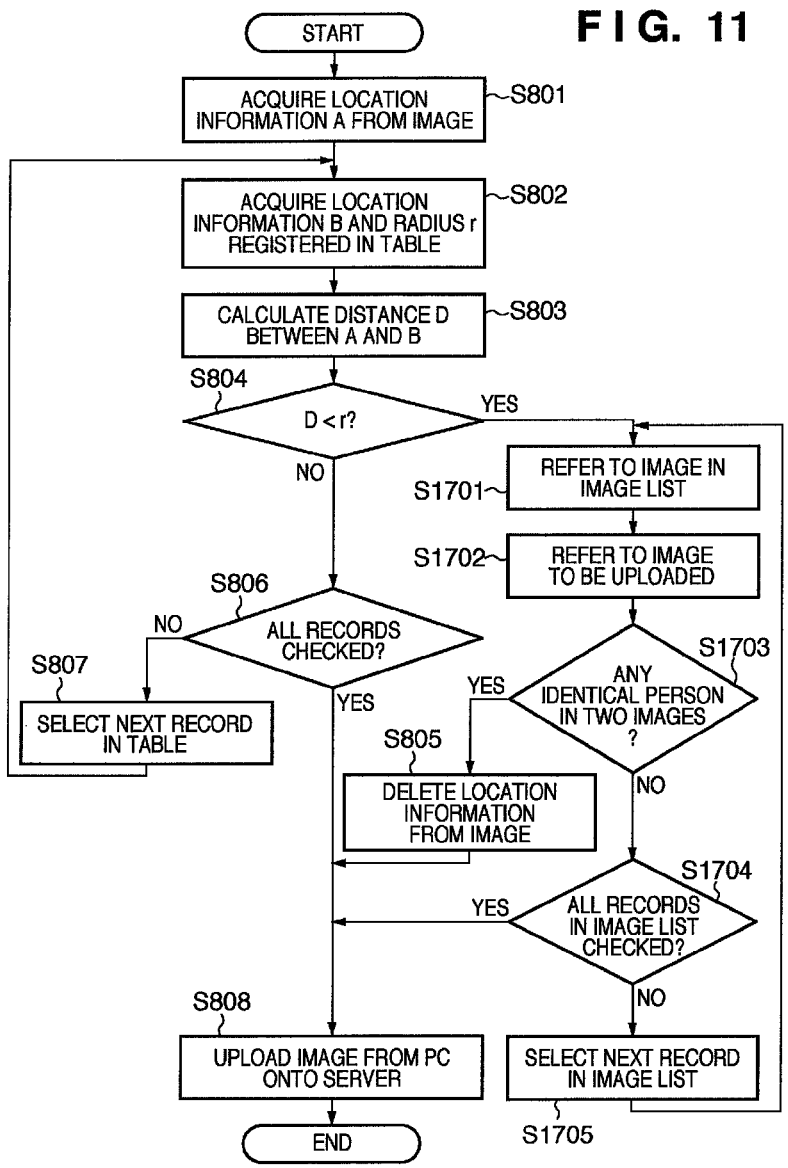
FIG. 11 is a diagram showing an image distribution process according to the third embodiment.

Now, image distribution control according to the third embodiment will be described below with reference to FIG. 11. With an image distribution process according to the third embodiment, when the location indicated by the location information added to the image to be distributed falls within an inhibited area, the image is distributed with the location information deleted if the image contains a face contained in an image registered in an image list.

Steps S801 to S808 are the same as those described in the first embodiment (FIG. 5). If it is determined in step S804 that the distance D is smaller than the radius r, the CPU 102 goes to step S1701. In steps S1701 to S1703, the CPU 102 carries out pattern checking to determine whether or not a face contained in the image to be distributed matches a face contained in any of registered images. In step S1701, the CPU 102 refers to an image registered in the image list 1500. Specifically, the CPU 102 acquires one record from the image list 1500 and then acquires the image to refer to based on the path described in the image path 1501 field of the acquired record. In step S1702, the CPU 102 acquires the image to be uploaded (i.e., the image to be distributed). Then, in step S1703, the CPU 102 determines whether the two images acquired in steps S1701 and S1702 show an identical person. To determine whether two images show an identical person, a known technique (e.g., Japanese Patent Laid-Open No. 09-251534) may be used.

If it is determined in step S1703 that the two images show an identical person, the CPU 102 deletes the location information from the image in step S805. Then, the CPU 102 goes to step S808. If it is determined in step S1703 that the two images do not show any identical person, the CPU 102 determines in step S1704 whether all the records in the image list 1500 have been checked. If it is determined in step S1704 that all the records in the image list 1500 have been checked, the CPU 102 goes to step S808. If it is determined in step S1704 that all the records in the image list 1500 have not been checked, the CPU 102 goes to step S1705 to select a next record in the image list 1500. Then, the CPU 102 returns to step S1701.

Thus, even if location information added to an image indicates a location within a specified inhibited area, the image can be distributed without deleting the location information if a registered person (face) is not shown in the image.

Although the third embodiment uses the inhibited area according to the first embodiment, needless to say, the inhibited area described in the second embodiment may be used alternatively.

With the configuration described above, even if location information added to an image indicates a location within a specified inhibited area, the location information is not deleted if the image does not show a registered face, but the presence or absence of a registered face may be handled in an opposite manner. Specifically, in a conceivable configuration, even if location information added to an image indicates a location within a specified inhibited area, the image can be distributed without deleting the location information if a registered person (face) is shown in the image. Also, when an image registered by image registration contains multiple faces, various methods are conceivable, including, for example:

(1) To delete the location information from the image to be distributed if a face detected in the image matches any one of the multiple faces, and (2) To delete the location information from the image to be distributed if faces detected in the image match all the multiple faces.

<Fourth Embodiment>

According to the third embodiment, even when the location indicated by the location information in the image falls within an inhibited area, the location information is not deleted if a predetermined condition is satisfied. An example of the predetermined condition has been that the image does not contain a preregistered pattern. According to the fourth embodiment, the predetermined condition is whether or not the recipient (publication site) has been preregistered. According to the fourth embodiment, even when the location indicated by the location information in the image falls within an inhibited area, the location information is not deleted if the recipient has been preregistered. Thus, if familiar persons are registered as recipients in advance, images can be distributed to the familiar persons with the location information added.

Figures 12A, 12B:
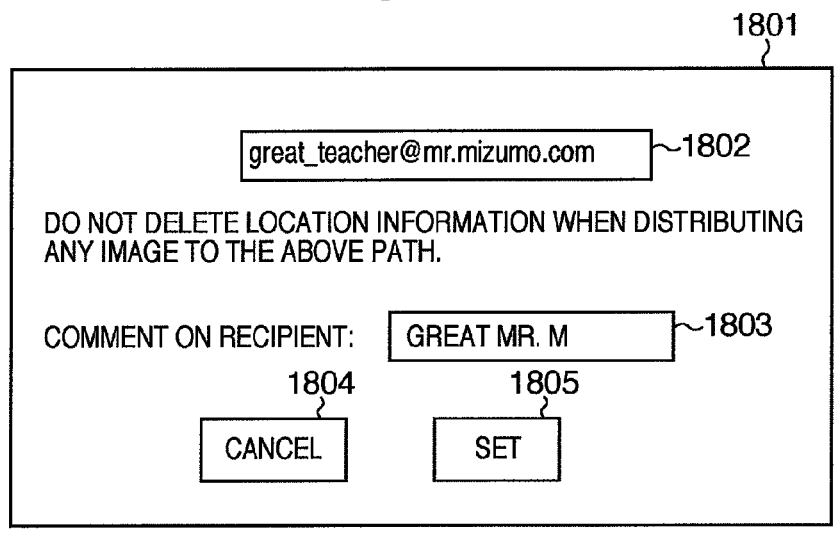
FIG. 12A is a diagram showing an example of a UI used for address registration, according to a fourth embodiment.
FIG. 12B is a diagram showing an example of an address list.

An example of a setting screen according to the fourth embodiment is shown in FIG. 12A. The setting screen 1801 is displayed in the display unit 106 of the information processing apparatus 100. By watching the setting screen 1801, the user registers an address to which images are to be distributed without deleting location information (recipient registration). The user enters a desired recipient address in a box 1802 and enters a comment on the address in a box 1803. When the user presses a Set button 1805, record 1910 is additionally registered in an address list 1900 as shown in FIG. 12B. Each record of the address list 1900 includes a comment 1901 field containing an entry of the box 1803 and an address 1902 field containing an entry of the box 1802. It is assumed that the address list 1900 is stored in the secondary storage device 104. However, the comment 1901 field is not essential.

Figure 13:
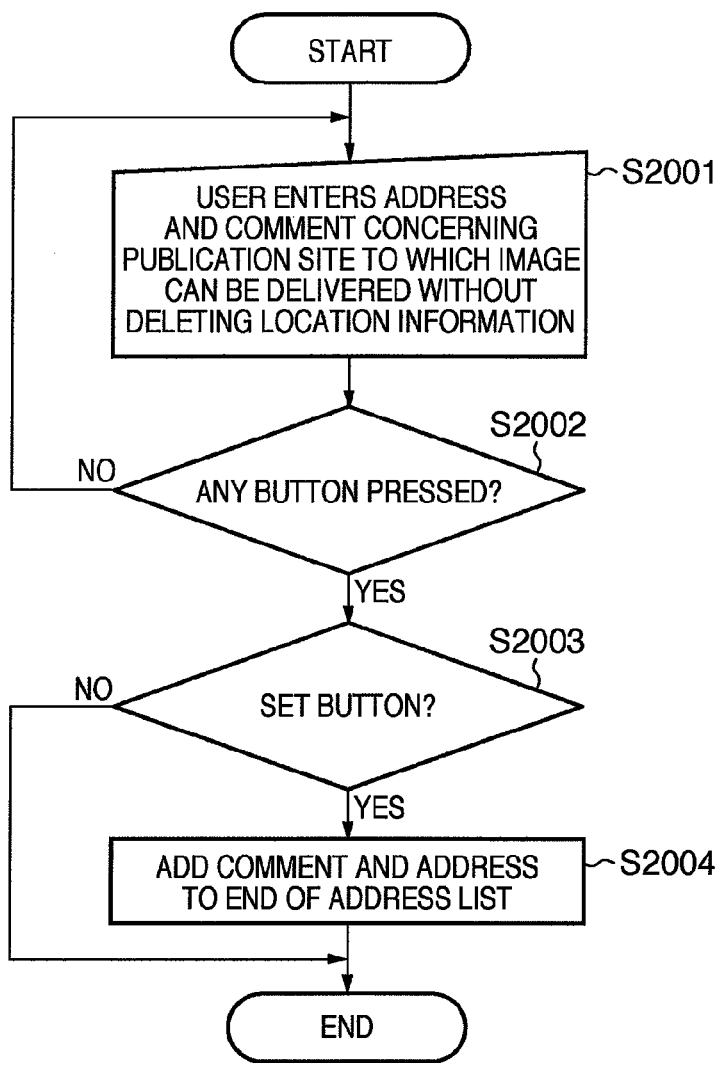
FIG. 13 is a diagram showing the process of registering an address in an address list, according to the fourth embodiment.

A registration process of the address list 1900 will be described below with reference to FIG. 13. In step S2001, the CPU 102 displays the setting screen 1801 in the display unit 106, allowing the user to enter an address and comment. In step S2002, the CPU 102 determines whether or not any button has been pressed. If it is determined in step S2002 that a button has been pressed, the CPU 102 goes to step S2003. If it is determined in step S2002 that no button has been pressed, the CPU 102 repeats step S2002 until a button is pressed. In step S2003, the CPU 102 determines whether or not the pressed button is the Set button 1805. If it is determined in step S2003 that the pressed button is the Set button 1805, the CPU 102 goes to step S2004 to add a record containing the address and comment entered in the setting screen 1801 to the end of the address list 1900 and thereby registers the record. On the other hand, if it is determined in step S2003 that the Cancel button 1804 has been pressed, the CPU 102 finishes the process right away.

Now, image distribution control according to the fourth embodiment will be described below with reference to FIG. 14. Steps S801 to S807 are the same as those described in the first embodiment (FIG. 5).

If it is determined in step S804 that the distance D is smaller than the radius r, the CPU 102 goes to step S2101. In steps S2101 to S2105, the CPU 102 performs address checking to determine whether or not a recipient address specified for distribution matches any of registered recipient addresses. In step S2101, the CPU 102 acquires a recipient address for the image to be distributed. In step S2102, the CPU 102 acquires the address from one of the records registered in the address list 1900. In step S2103, the CPU 102 determines whether the two addresses acquired in steps S2101 and S2102 match. If it is determined in step S2103 that the two addresses match, the CPU 102 goes to step S2106 to distribute the image to the specified address. On the other hand, if it is determined in step S2103 that the two addresses do not match, the CPU 102 determines in step S2104 whether all the records in the address list 1900 have been checked. If it is determined in step S2104 that all the records in the address list 1900 have been checked, the CPU 102 goes to step S805 to delete the location information from the image. Then, the CPU 102 goes to step S2106. If it is determined in step S2104 that all the records in the address list 1900 have not been checked, the CPU 102 goes to step S2105 to select a next record in the address list 1900. Then, the CPU 102 returns to step S2102.

As described above, according to the fourth embodiment, even when the location indicated by added location information falls within an inhibited area, the image can be distributed with the location information added if the image is distributed to a preregistered recipient.

Although the fourth embodiment uses the inhibited area according to the first embodiment, needless to say, the inhibited area according to the second embodiment may be used alternatively. Also, the fourth embodiment may be configured such that even when the location indicated by added location information falls within an inhibited area, the image can be distributed with the location information added if the recipient has not been registered.

Preferred embodiments of the present invention have been described in detail above. Nevertheless, the present invention is not limited to these specific embodiments and the invention can be achieved through various other embodiments without departing from the spirit and scope of the invention. Parts of the embodiments described above may be combined as appropriate. For example, it is apparent that exception handling of the third embodiment and exception handling of the fourth embodiment may be used at the same time.

This will be described more specifically. In the first to fourth embodiments, conditions A to C below are used to determine whether to delete location information.

A: The photographed site is within a registered range (first and second embodiments)

B: The photographic image contains the face of a specific person (third embodiment)

C: The destination of the photographic image is a registered address (fourth embodiment)

In the first and second embodiments, location information is deleted when condition A is true. In the third embodiment, location information is deleted when "condition A ∧ condition B" is true (∧ represents logical AND). In the fourth embodiment, location information is deleted when "condition A ∧ ¬ condition C" is true (¬ represents logical NOT).

To delete location information, conditions A to C can be used in any appropriate combination. For example, location information may be configured to be deleted when "condition A ∧ condition B ∧ ¬ condition C" is true (i.e., the photographed site is within a registered range, the photographic image contains the face of a specific person, and the destination of the photographic image is not a registered address). Processing procedures for that will be apparent to those skilled in the art from the flowcharts in FIGS. 11 and 14 described above. User interfaces used for that will also be apparent to those skilled in the art from the description of FIGS. 9A and 12A.

Also, location information may be configured to be deleted when "condition A ∧ (condition B ∧ ¬ condition C)" is true (i.e., the photographed site is within a registered range, and the photographic image contains the face of a specific person or the destination of the photographic image is not a registered address). Furthermore, location information may be configured to be deleted when "condition A ∧ ¬ condition B" is true (i.e., the photographed site is within a registered range and the photographic image does not contain the face of a specific person) or location information may be configured to be deleted when "condition B ∧ ¬ condition C" is true (i.e., the photographic image contains the face of a specific person and the destination of the photographic image is not a registered address).

Also, as the conditions for determining whether to delete location information, the user may be allowed to specify a desired combination of conditions A, B, and C described above. Specifically, the user may be allowed to create a logic operation of conditions A, B, and C and location information may be deleted when the result of the logic operation is true.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable storage medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2009-253524, filed Nov. 4, 2009 and 2010-214336, filed Sep. 24, 2010, which are hereby incorporated by reference herein in their entirety.

What is claimed is:

1. An image distribution apparatus which distributes image data to which location information has been added, comprising a processor coupled to a memory and programmed to provide:
   a face checking unit configured to determine whether or not the image data includes a human face of a specific person; and
   a distribution control unit configured to distribute the image data by deleting the location information from the image data to he distributed if said face checking unit determines that a human face of the specific person is included in the image data, and distribute the image data with the location information being added if said face checking unit determines that a human face of the specific person is not included in the image data.

2. The apparatus according to claim 1, wherein the processor is further programmed to provide:
   a storage unit configured to store information specifying an inhibited area concerning the location information;
   an acquisition unit configured to acquire the location information added to the image data to be distributed; and
   a location checking unit configured to determine whether or not a location indicated by the location information acquired by said acquisition unit falls within the inhibited area stored in said storage unit,
   wherein said distribution control unit distributes the image data by deleting the location information from the image data to be distributed if said face checking unit determines that a human face of the specific person is included in the image data and said location checking unit determines that the location falls within the inhibited area.

3. The apparatus according to claim 1, wherein the inhibited area is defined by information about a geographical location and information about a size of a range centered around the geographical location.

4. The apparatus according to claim 1, wherein the processor is further programmed to provide
   a memory storing a face image of the specific person,
   wherein said face checking unit is configured to determine whether or not the image data includes a human face of a person identical to the specific person whose face image is stored in said memory.

5. The apparatus according to claim 1, wherein the processor is further programmed to provide:
   a recipient registration unit in which a recipient address is registered; and
   an address checking unit configured to determine whether or not a recipient address of the image data to be distributed matches a recipient address registered in said recipient registration unit,
   wherein, even if said face checking unit determines that a human face of the specific person is included in the image data, said distribution control unit distributes the image data with the location information being added if said address checking unit determines that the recipient address of the image data to be distributed matches the recipient address registered in said recipient registration unit.

6. A control method for an image distribution apparatus including a processor, which distributes image data to which location information has been added, the control method comprising:
   a face checking step of determining, using the processor, whether or not the image data includes a human face of a specific person;
   a distribution control step of distributing, using the processor, the image data by deleting the location information from the image data to be distributed if it is determined in said face checking step that a human face of the specific person is included in the image data, and distributing the image data with the location information being added if it is determined in said face checking step that a human face of the specific person is not included in the image data.

7. A non-transitory computer-readable storage medium storing a computer program for causing a computer of an image distribution apparatus, which distributes image data to which location information has been added, to execute:
   a face checking step of determining whether or not the image data includes a human face of a specific person;
   a distribution control step of distributing the image data by deleting the location information from the image data to be distributed if it is determined in said face checking step that a human face of the specific person is included in the image data, and distributing the image data with the location information being added if it is determined in said face checking step that a human face of the specific person is not included in the image data.

* * * * *